(12) United States Patent
Nippa et al.

(10) Patent No.: US 7,373,047 B2
(45) Date of Patent: May 13, 2008

(54) EMBEDDED ELECTRODE INTEGRATED OPTICAL DEVICES AND METHODS OF FABRICATION

(75) Inventors: David W. Nippa, Dublin, OH (US); Steven M. Risser, Reynoldsburg, OH (US); Richard W. Ridgway, Westerville, OH (US); Tim L. Shortridge, Pataskala, OH (US); Vincent McGinniss, Sunbury, OH (US); Kevin Spahr, Worthington, OH (US)

(73) Assignee: Optimer Photonics, Inc., Columbus, OH (US)

( * ) Notice: Subject to any disclaimer, the term of this patent is extended or adjusted under 35 U.S.C. 154(b) by 236 days.

(21) Appl. No.: 10/719,892

(22) Filed: Nov. 21, 2003

(65) Prior Publication Data

US 2004/0131303 A1      Jul. 8, 2004

Related U.S. Application Data

(60) Provisional application No. 60/428,160, filed on Nov. 21, 2002.

(51) Int. Cl.
*G02F 1/025*    (2006.01)
*G02F 1/313*    (2006.01)

(52) U.S. Cl. ............................ 385/40; 385/2; 385/8

(58) Field of Classification Search ................. 385/2, 385/8, 40
See application file for complete search history.

(56) References Cited

U.S. PATENT DOCUMENTS 3,558,213 A    1/1971   Marcatili
3,589,794 A    6/1971   Marcatili
3,850,503 A    11/1974  Riseberg et al.
4,070,094 A    1/1978   Martin (Continued)

FOREIGN PATENT DOCUMENTS

EP       0335672 A      10/1989

(Continued)

OTHER PUBLICATIONS

Schilakk, Modulation Behaviour of Integrated Optical Couplers, Journal of Optical Communications, 1984, 122-131.

(Continued)

*Primary Examiner*—Michelle R. Connelly-Cushwa
*Assistant Examiner*—Jerry T. Rahll
(74) *Attorney, Agent, or Firm*—Dinsmore & Shohl, LLP

(57) ABSTRACT

Waveguide devices and schemes for fabricating waveguide devices useful in applications requiring modulation, attenuation, polarization control, and switching of optical signals are provided. In accordance with one embodiment of the present invention, a method of fabricating an integrated optical device is provided. The method comprises the acts of: (i) providing a support wafer defining an electrode support surface; (ii) forming an electrode pattern over the electrode support surface of the support wafer; (iii) forming a non-polymeric buffer layer on at least a portion of the electrode pattern and over at least a portion of the support wafer; (iv) forming a waveguide core material layer over the non-polymeric silica-based buffer layer; (v) removing portions of the core material layer to define a waveguide core; and (vi) positioning a cladding material in optical communication with the waveguide core such that the buffer layer, the cladding material, and the waveguide core define an optically-clad waveguide core.

59 Claims, 7 Drawing Sheets

U.S. PATENT DOCUMENTS

| | | | |
|---|---|---|---|
| 4,730,171 A | 3/1988 | So et al. | |
| 4,737,014 A | 4/1988 | Green | |
| 4,884,858 A | 12/1989 | Ushikubo et al. | |
| 4,896,930 A | 1/1990 | Tsuchitani et al. | |
| 4,936,645 A | 6/1990 | Yoon et al. | |
| 5,045,364 A | 9/1991 | Fang | |
| 5,078,511 A | 1/1992 | Noll et al. | |
| 5,093,883 A * | 3/1992 | Yoon et al. | 385/130 |
| 5,138,687 A | 8/1992 | Horie et al. | |
| 5,151,959 A | 9/1992 | Mueller et al. | |
| 5,243,680 A | 9/1993 | Soane | |
| 5,315,422 A | 5/1994 | Utaka et al. | |
| 5,513,283 A | 4/1996 | Whang et al. | |
| 5,533,151 A | 7/1996 | Leonard | |
| 5,546,480 A | 8/1996 | Leonard | |
| 5,581,642 A | 12/1996 | Deacon et al. | |
| 5,659,010 A | 8/1997 | Sotoyama et al. | |
| 5,703,710 A | 12/1997 | Brinkman et al. | |
| 5,724,461 A | 3/1998 | Bruno et al. | |
| 5,732,177 A | 3/1998 | Deacon et al. | |
| 5,751,867 A | 5/1998 | Schaffner et al. | |
| 5,818,983 A | 10/1998 | Yoshimura et al. | |
| 5,822,100 A | 10/1998 | Robinson et al. | |
| 5,825,525 A | 10/1998 | Harwit | |
| 5,835,644 A | 11/1998 | Oh et al. | |
| 5,854,866 A | 12/1998 | Leonard | |
| 5,857,039 A | 1/1999 | Bosc et al. | |
| 5,862,276 A | 1/1999 | Karras | |
| 5,887,089 A | 3/1999 | Deacon et al. | |
| 5,894,532 A | 4/1999 | Moores | |
| 5,970,186 A | 10/1999 | Kenney et al. | |
| 6,022,671 A | 2/2000 | Binkley et al. | |
| 6,028,973 A | 2/2000 | Schienle et al. | |
| 6,046,839 A | 4/2000 | Ito et al. | |
| 6,137,619 A | 10/2000 | Chen et al. | |
| 6,144,779 A | 11/2000 | Binkley et al. | |
| 6,167,169 A | 12/2000 | Brinkman et al. | |
| 6,195,479 B1 | 2/2001 | Pan | |
| 6,243,517 B1 | 6/2001 | Deacon | |
| 6,311,004 B1 | 10/2001 | Kenney et al. | |
| 6,320,990 B1 | 11/2001 | Sun | |
| 6,361,717 B1 | 3/2002 | Dalton et al. | |
| 6,507,681 B1 | 1/2003 | Kowalczyk et al. | |
| 6,558,585 B1 | 5/2003 | Zhang et al. | |
| 6,643,419 B2 | 11/2003 | Chang et al. | |
| 6,693,736 B1 * | 2/2004 | Yoshimura et al. | 359/333 |
| 6,711,308 B2 * | 3/2004 | Erben et al. | 385/3 |
| 2001/0041025 A1 | 11/2001 | Farahi | |
| 2002/0094150 A1 | 7/2002 | Lim et al. | |
| 2002/0131663 A1 | 9/2002 | Marks et al. | |
| 2003/0174982 A1 | 9/2003 | Ridgway et al. | |

FOREIGN PATENT DOCUMENTS

| | | |
|---|---|---|
| EP | 0 421 075 A | 4/1991 |
| EP | 0513919 A | 11/1992 |
| EP | 0898348 A | 2/1999 |
| GB | 2236402 A | 4/1991 |
| JP | 05 323243 | 12/1993 |
| JP | 09 090299 | 4/1997 |
| WO | WO 03/010592 A2 | 2/2003 |
| WO | WO 03/012532 A2 | 2/2003 |

OTHER PUBLICATIONS

Marcatili, Dielectric Rectangular Waveguide and Directional Coupler for Integrated Optics, Bell Syst. tech. J., vol. 48, pp. 22-111, Sep. 1969.

Themistos et al., Design Considerations for an Electrooptic Directional Coupler Modulator, Journal of Lightwave Technology, vol. 17, No. 4, Apr. 1999.

Kaplan et al., Layout For Polarization Insensitive Modulation in LiNbO3 Waveguides; IEEE Journal of Selected Topics In Quantum Electronics; Jan. 2000; pp. 83-87; vol. 6 No. 1; IEEE; Israel.

Duthie et al., A Polarization Independent Guided-Wave LiNbO3 Electrooptic Switch Employing Polarization Diversity; IEEE Photonics Technology Letters, pp. 136-137, vol. 3, No. 2; Feb. 1991.

Saida et al., Planer Lightwave Circuit Polarization-Mode Dispersion Compensator; IEEE Photonics Technology Letters, pp. 507-509; vol. 14, No. 4; Apr. 2002.

Liao et al.; Design and Fabrication of Wide-Angle TE-TM Mode Splitter in Lithium Niobate; IEEE Journal of Selected Topics in Quantum Electronics; pp. 88-93; vol. 6, No. 1.; Jan./Feb. 2000.

Hu et al.; Tunable Mach-Zehnder Polarization Splitter Using Height-Tapered Y-Brances; 1997; pp. 773-775.

Interferometric-Type Polarisation Splitter On Z-Propagating LiNbO3; Ti; Electronics Letters; 1990.

Oh Hyun-Ho et al.; Polarization-Independent Phase Modulator Using Electro-optic Polymer; Electronics Letters, IEE Stevenage, GB, vol. 36, No. 11; May 25, 2000; pp. 969-970.

Yoshito Shuto et al.; Optical Intensity Modulators Using Diazo-Dye Substituted Polymer Channel Waveguides; IEEE Journal of Quantum Electronics, IEEE Inc., vol. 31, No. 8, Aug. 1, 1995, pp. 1451-1460.

Muto S. et al.; Slab Waveguide-Type Optical Modulators Using Optically Active and Nonlinear Polymers; Molecular Crystals and Liquid Crystals Science and Technology Section B; Nonlinear Optics; vol. 22, No. 1-4, 1999, pp. 449-452.

Parker et al.; Multiple-Order PMD Compensation Using a Single Activity Chirped AWG; Proceedings 27th European Conference on Optical Communication; Amsterdam; Netherlands; Sep. 30-Oct. 4, 2001; vol. 3, Sep. 30, 2001; pp. 424-425.

Horowitz et al.; Towards Better Control of Sol-Gel Film Processing For Optical Device Applications; Journal of Nonlinear Optical Physics and Materials; 1997; vol. 6, No. 1; pp. 1-18; World Scienctific Publishing Company.

Shi Y et al: "Electro-Optic Polymer Modulators with A 0.8 V Half-Wave Voltage", Applied Physics Letters, American Institute of Physics, New York, U.S., vol. 77, No. 1, Jul. 3, 2000, pp. 1-3.

Min Yoo Hong et al: "Mach-Zehnder Electro-Optic Mudulator Based on Organic-Silica Sol-Gel Hybrid Films", Electronics Letters, IEE Stevenage, G.B., vol. 35, No. 20, Sep. 30, 1999, pp. 1770-1771.

Chon JC et al: "Laser Ablation of Nonlinear-Optical Polymers to Define Low-Loss Optical Channel Waveguides", Optics Letters, Optical Society of America, Washington, U.S., vol. 19, No. 22, Nov. 15, 1994, pp. 1840-1842.

* cited by examiner

EMBEDDED ELECTRODE INTEGRATED OPTICAL DEVICES AND METHODS OF FABRICATION

CROSS-REFERENCE TO RELATED APPLICATIONS

This application claims the benefit of U.S. Provisional Application Ser. No. 60/428,160, filed Nov. 21, 2002. This application is related to U.S. patent application Ser. No.: 09/916,238, filed Jul. 26, 2001; Ser. No. 10/098,730 and Ser. No. 10/098,731, filed Mar. 15, 2002; Ser. No. 10/302,793, filed Nov. 22, 2002; and Ser. No. 10/395,835, filed Mar. 24, 2003, the disclosures of which are incorporated herein by reference.

BACKGROUND OF THE INVENTION

The present invention relates to optical signal transmission and, more specifically, to improved waveguide devices useful in applications requiring modulation, attenuation, polarization control, and switching of optical signals.

BRIEF SUMMARY OF THE INVENTION

Integrated optical devices including embedded electrodes and methods of fabrication of such devices are provided. In accordance with one embodiment of the present invention, a method of fabricating an integrated optical device is provided. The method comprises the acts of: (i) providing a support wafer defining an electrode support surface; (ii) forming an electrode pattern over the electrode support surface of the support wafer; (iii) forming a non-polymeric buffer layer on at least a portion of the electrode pattern and over at least a portion of the support wafer; (iv) forming a waveguide core material layer over the non-polymeric silica-based buffer layer; (v) removing portions of the core material layer to define a waveguide core; and (vi) positioning a cladding material in optical communication with the waveguide core such that the buffer layer, the cladding material, and the waveguide core define an optically-clad waveguide core.

In accordance with another embodiment of the present invention, the buffer layer is formed over the electrode pattern and the support wafer through a sol-gel process characterized by a maximum processing temperature below about 400° C.

In accordance with yet another embodiment of the present invention, an integrated optical device is provided comprising a support wafer, an electrode pattern, a non-polymeric silica-based buffer layer, a waveguide core material layer, and a cladding material. The support wafer defines an electrode support surface. The electrode pattern is formed over the electrode support surface of the support wafer. The non-polymeric silica-based buffer layer is formed on at least a portion of the electrode pattern and over at least a portion of the support wafer. The waveguide core material layer is formed over the buffer layer. The cladding material is in optical communication with the waveguide core such that the buffer layer, the cladding material, and the waveguide core define an optically-clad waveguide core.

Accordingly, it is an object of the present invention to provide improved waveguide devices and a scheme for fabricating improved waveguide devices useful in applications requiring modulation, attenuation, polarization control, and switching of optical signals. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
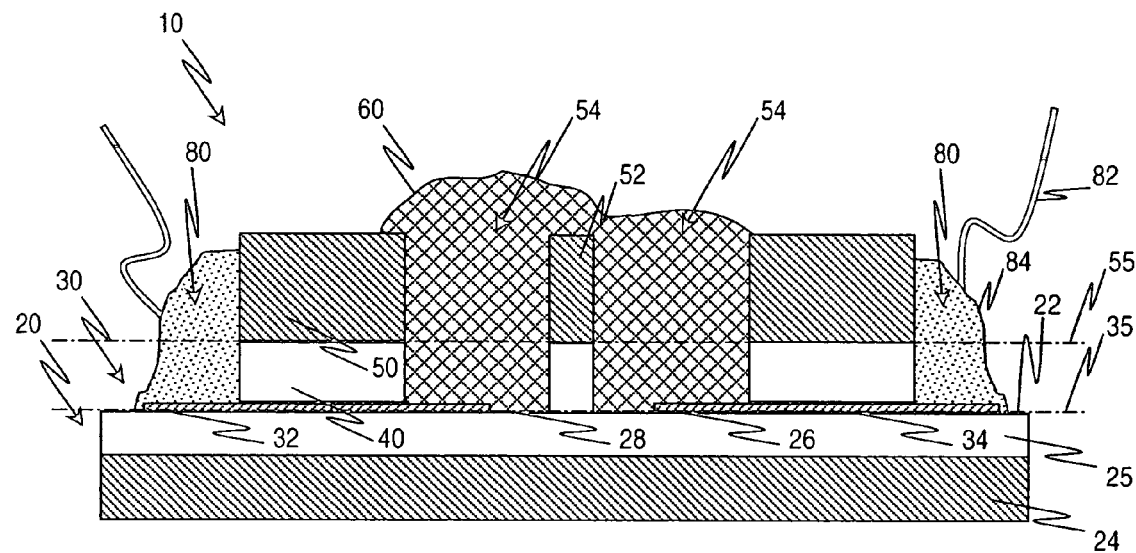
FIGS. 1-3 are schematic illustrations, taken in cross section, of embedded electrode integrated optical devices according to various embodiments of the present invention.

Referring initially to FIGS. 1-4, integrated optical devices 10 according to the present invention are illustrated. It is noted that the devices 10 are illustrated in a somewhat generic nature because the devices 10 may take the form of any one of a variety of specific types of waveguide devices where embedded electrodes, an optically functional or non-functional cladding, and an optically functional or non-functional waveguide core are employed. For example, the teachings of the present invention may be employed in the context of one or more devices disclosed in the above-noted related patent applications, the disclosures of which have been incorporated herein by reference. The teachings of the present application may be utilized with the teachings of these and other pertinent references to render any one of variety of workable devices and fabrication schemes.

Referring again to FIGS. 1-4, each integrated optical device 10 comprises a support wafer 20, an electrode pattern 30, a non-polymeric silica based buffer layer 40, a waveguide material layer 50 and core 52, a cladding material 60, and one or more contact regions 80. The support wafer 20 is provided as a silicon wafer 24 carrying a silica coating 25, the silica coating defining an electrode support surface 22. The electrode pattern 30 is formed over the electrode support surface 22 of the support wafer 20. The buffer layer 40 is formed over the electrode pattern 30 and the support wafer 20. The waveguide core material layer 50 is formed over the buffer layer 40.

For the purposes of describing and defining the present invention, it is noted that a distinction is intended between the respective meanings of the positional terms "over" and "on." Specifically, if a layer is formed "over" another layer it is contemplated that an intervening layer of another material may be present between the two layers. In contrast, if a layer is formed "on" another layer, no intervening layer is contemplated. For example, referring to FIG. 1, the core material layer 50 may be said to be formed "over," but not "on" the support wafer 20.

As will be described in further detail herein, the electrode pattern 30, the buffer layer 40, and the waveguide core 52 are formed such that the electrode pattern 30, which may include one or more electrically isolated, substantially coplanar control electrodes 32, 34, is embedded in the device beneath the waveguide core 52. One or more contact regions 80 are formed over the electrode pattern 30. Conductive leads 82 may be brought into contact with the electrode pattern 30 in the contact regions 80 with the aid of a conductive epoxy 84, via wire bonding, or through any other suitable means for conductively coupling the leads 82 to the electrode pattern 30. Prior to bringing the conductive leads 82 into contact with the electrode pattern, the pair of contact regions may be treated with hydrofluoric acid or another suitable material to remove residual insulating material, including residual cladding material, from the pair of contact regions 80.

Figure 5:
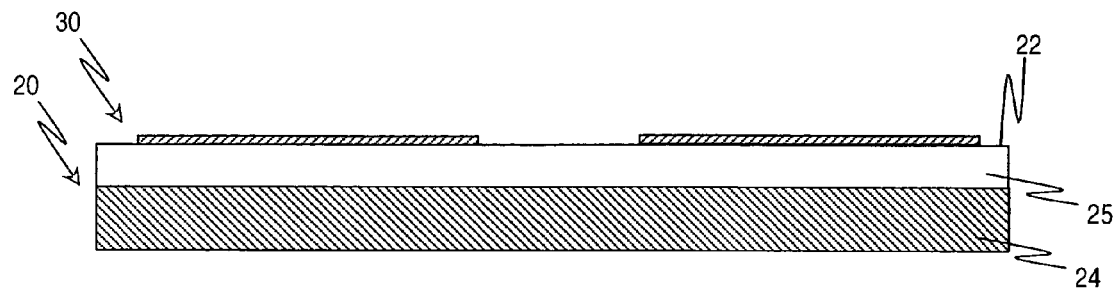
FIGS. 5-7 illustrate a method of fabricating integrated optical devices according to the present invention.
Figure 6:
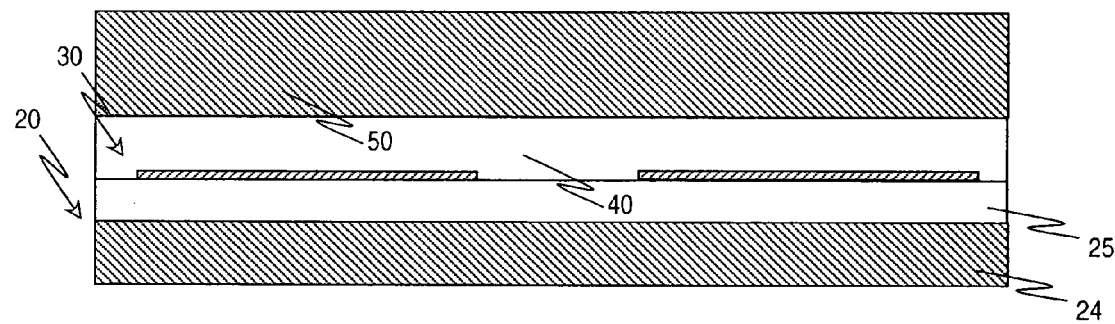
Figure 7:
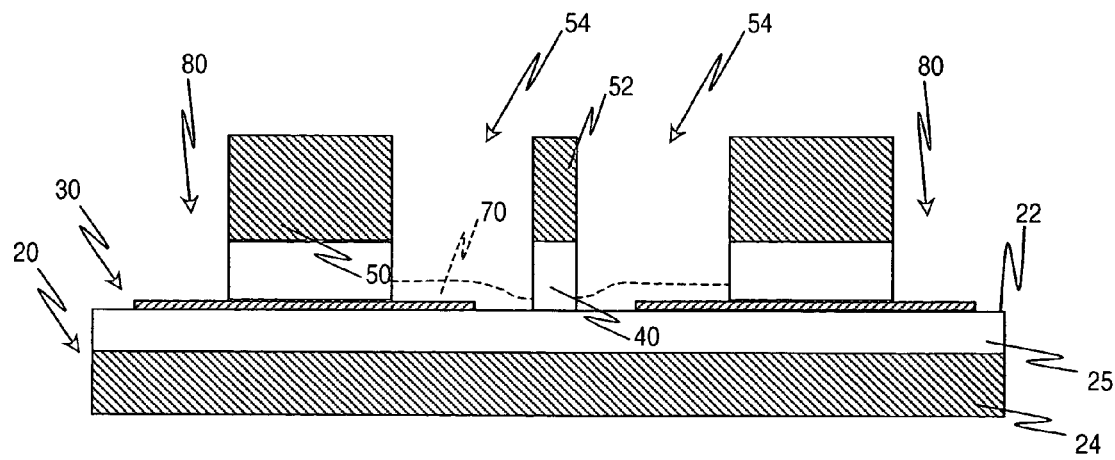

The various fabrication methods according to the present invention may be described with reference FIGS. 5-7. Initially, the support wafer 20 defining the electrode support surface 22 is provided. The electrode pattern 30 is formed over the electrode support surface 22 of the support wafer 20 (see FIG. 5). Next, the non-polymeric, silica based buffer layer 40 is formed over the electrode pattern 30 and the support wafer 20. A waveguide core material layer 50 is formed over the buffer layer 40 (see FIG. 6). Portions of the core material layer 50 are removed to define a waveguide core 52 and a pair of cladding containment regions 54 extending along opposite sides of the waveguide core 52 in a direction substantially parallel to a longitudinal dimension of the waveguide core 52 (see FIG. 7). In this manner, the cladding material 60 illustrated in FIGS. 1-3, which is often initially a substantially non-rigid material like a gel or a viscous fluid, may be positioned within the pair of cladding containment regions 54, in optical communication with the waveguide core 52. The cladding containment regions provide an effective means by which the cladding material 60 may be presented in the device 10 in a stable manner.

Figure 2:
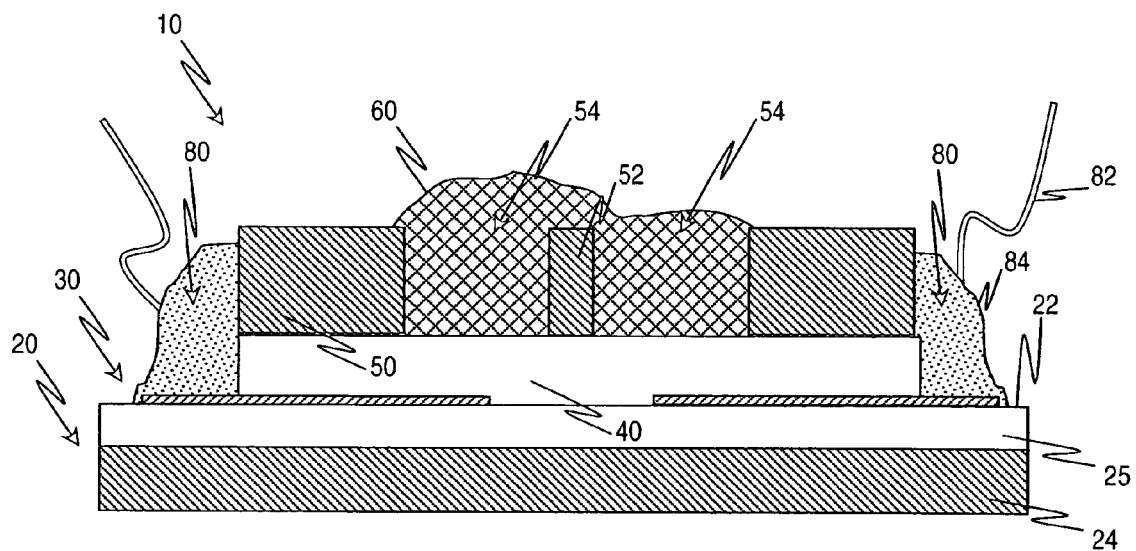
Figure 3:
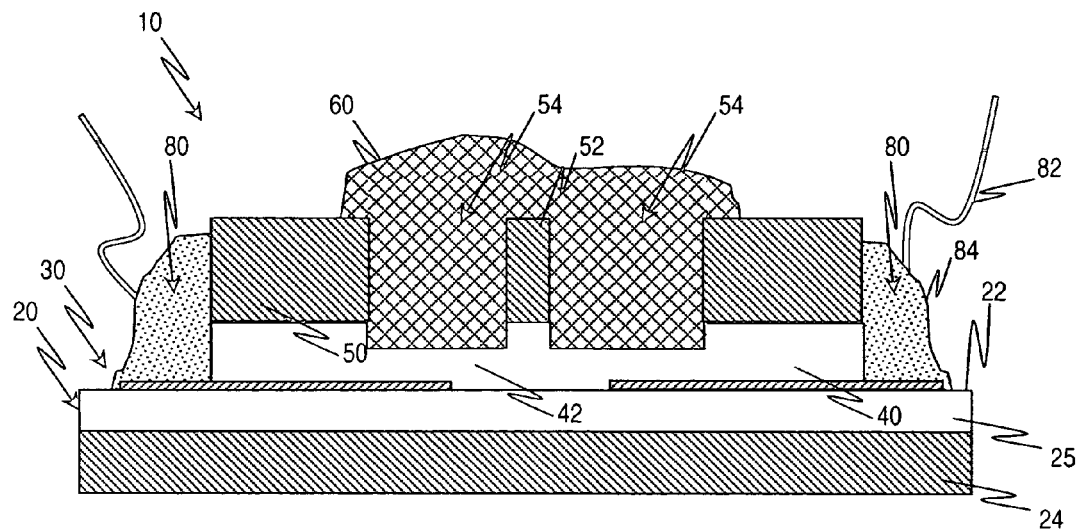
Figure 4:
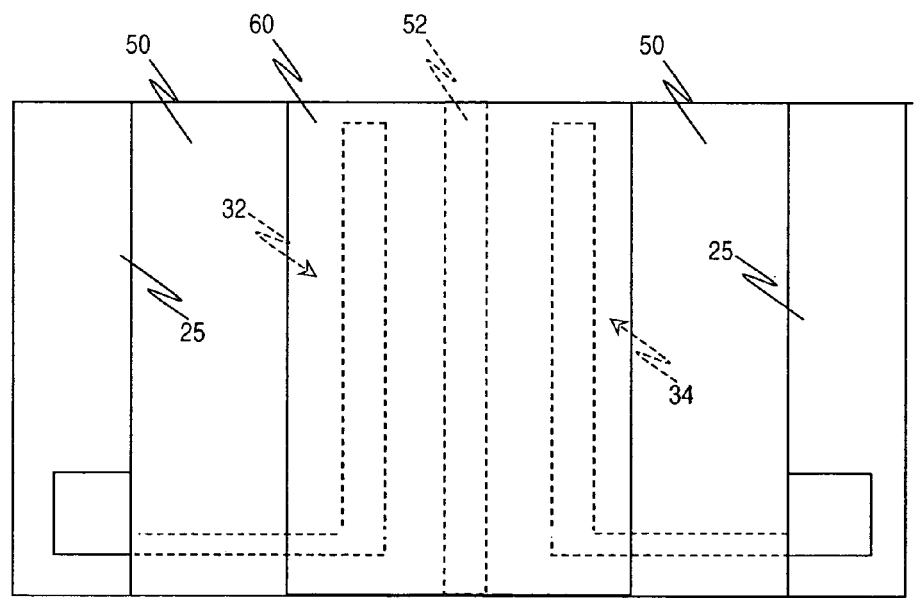
FIG. 4 is a schematic illustration, take in plan view, of portions of the integrated optical devices illustrated in FIGS. 1-3.

As is illustrated in FIGS. 1-3, the extent to which buffer layer removal is effected during formation of the cladding containment regions 54 may vary. For example, in the embodiment of FIG. 1, substantially all of those portions of the buffer layer 40 aligned with the cladding containment regions 54 are removed during formation of the cladding containment region. In contrast, referring to the embodiment of FIG. 2, the buffer layer 40 is left largely unaffected by the cladding containment region forming step. In FIG. 3, substantial portions of the buffer layer 40 aligned with the cladding containment regions 54 remain, defining a remaining protective layer 42 over the electrode pattern within the cladding containment regions 54.

In the embodiments of FIGS. 2 and 3, the remaining buffer layer thickness in the cladding containment regions 54 is sufficient to form an electrically insulative barrier between the pair of control electrodes 32, 34. As is illustrated in FIG. 7, if substantially all of the buffer layer thickness in the cladding containment regions 54 is removed, it may be preferable to provide an electrically insulative barrier layer 70 over the pair of control electrodes 32, 34 prior to positioning the cladding material within the pair of cladding containment regions 54. The insulative barrier layer 70 may comprise silica or any other suitable electrical insulating material.

The above description of the fabrication steps according to the present invention is general in nature because it is contemplated that a variety of suitable fabrication steps may be employed within the scope of the present invention. For example, referring to FIG. 1, by way of illustration and not limitation, it is contemplated that the waveguide core 52 may be formed through a process by which the position of the core 52 in a plane 55 offset from and generally parallel to a plane 35 occupied by the control electrodes 32, 34 is controlled relative to respective positions of the pair of control electrodes 32, 34 in the control electrode plane 35. For example, by way of illustration and not limitation, appropriate portions of the core layer 50 may be removed by patterning the core material layer utilizing a waveguide mask and, e.g., reactive ion etching the waveguide structure.

Figure 13:
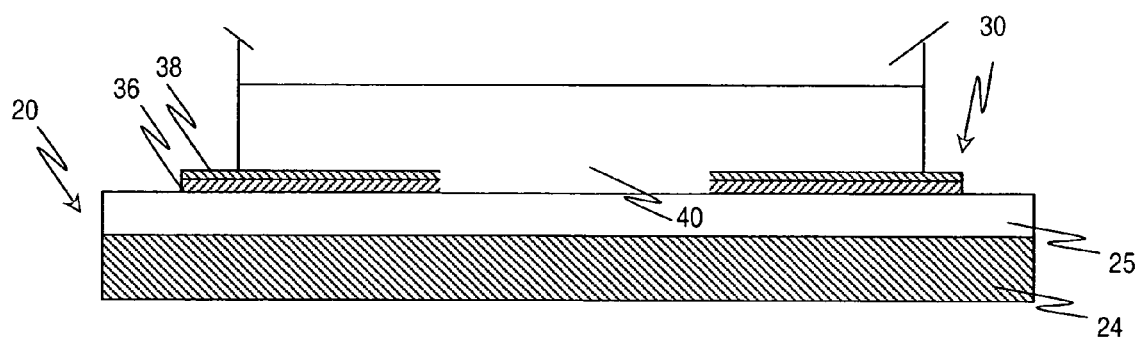
FIG. 13 is an illustration of an alternative embedded electrode design according to the present invention.

The electrode pattern 30 may comprise any suitable conductive material. It is contemplated, for example, that Au, Pt, Cr, Ta, Ti, indium tin oxide, and combinations thereof, may be suitable conductive materials. Cr is likely to be advantageous in many embodiments because of its good adhesive characteristics and relatively low resistivity. Particularly advantageous conductive materials will be characterized by melting points of at least about 1500° C. Referring to FIG. 13, it is contemplated that the electrode pattern may comprise first and second conductive layers 36, 38—the first conductive layer 36 having relatively enhanced adhesive properties and the second conductive layer 38 having relatively enhanced conductive properties. The electrode pattern may define a thickness of between about 600 Å and about 20,000 Å.

The buffer layer 40 and cladding material 60 preferably comprise materials having refractive indices that are lower than the refractive index of the core material 50 at an operating temperature and operating wavelength of the device. For example, where the core 52 comprises a material characterized by a refractive index of between about 1.450 and about 1.455 at a selected operating temperature and operating wavelength of the device, the buffer layer 40 and the cladding material 60 may comprise materials characterized by refractive indices of between about 1.440 and about 1.450. The buffer layer 40 and the cladding material 60 are preferably transmissive to light of at least one commonly used telecommunication wavelength, e.g, about 860 nm, about 1.3 µm, and about 1.55 µm, or at a selected operational wavelength of the device 10.

It may be advantageous to ensure that the buffer layer 40 comprises an electrically insulating, non-metallic material. For example, the buffer layer may comprise a material selected from silica, SiOx (1.5<x<2), SiON, an insulating metal-oxide glass, and combinations thereof. Typical buffer layer dimensions range from between about 3 µm and about 10 µm in thickness, although it is contemplated that a variety of thickness dimensions will be suitable.

According to one embodiment of the present invention, the buffer layer 40 is formed through a sol-gel process characterized by a maximum processing temperature below about 400° C. In this manner, the buffer layer 40 can be formed at processing temperatures that are not likely to result in damage to or degradation of the electrode pattern 30. Sol-gel processing may be utilized to form passive, active, and nonlinear optical materials for optical devices according to the present invention. Many of the principles and desirable features of photolithographic definition can be extended to sol-gel materials. Sol-gel techniques, in which glasses are formed from organic precursors by low temperature polymerization reactions, offer attractive advantages in terms of flexibility of composition and structure. Generally, sol-gel processes consist of three steps: first, a colloidal suspension of oxide particles (the "sol") is formed by hydrolysis and condensation of a precursor (e.g. and alkoxide); next, the sol is dried such that further condensation creates a semi-rigid "gel"; finally, heat treatment of the gel is used to eliminate remaining organic ligands and to complete densification. The sol may be dip, spin, or spray-coated. Thick films can be obtained by multiple coatings.

It is contemplated that other processing schemes may be employed to form the buffer layer 40. In the event the buffer layer 40 comprises a high melting point silica-based material 21 (mp>1500° C.), preferred processing schemes should be selected where buffer layer formation may be achieved at temperatures well below (e.g., at least about 500° C. below) the melting point of the silica-based material 40 and the melting point of significant or major constituents of the electrode pattern 30. In this manner, buffer layers according to the present invention may be formed without causing undue damage to the materials of the electrode pattern 30. For example, in addition to the sol-gel processed described above, the buffer layer 40 may be formed through a plasma enhanced chemical vapor deposition process characterized by a maximum processing temperature below, e.g., about 1000° C.

The waveguide core material layer 50 may comprise any material suitable for operation as a waveguide core. For example, suitable materials include, but are not limited to, polymers, silica, doped silica, and combinations thereof. The waveguide core material layer 50 may be formed over the buffer layer 40 through a sol-gel process in a manner similar to that described above with reference to the buffer layer 40. The core layer 50 preferably comprises a material that is transmissive to light at 860 nm, 1.3 µm, 1.55 µm, or any suitable telecommunication or operational wavelength of the device 10. Although a variety of core layer dimensions are contemplated by the present invention, typical core layers define a thickness of between about 3 µm and about 10 µm.

The cladding material 60 may comprise an electrooptic medium or any other medium where a control signal applied to the electrode pattern 30 alters the velocity, phase, polarization, amplitude, or some other transmission characteristic of light propagating along the waveguide core 52. Although a variety of conventional cladding mediums are suitable for use in the present invention, it is noted that the above-noted patent documents incorporated herein by reference include further teachings relative to selection of a suitable medium. For example, the cladding medium may comprise a polymeric or non-polymeric medium. Examples of polymeric cladding mediums include, but are not limited to, thermoplastics, thermosets, UV cured materials, cross linked materials, and sol-gel materials. The cladding material 60 may include an electrooptic chromophore and may comprise a Pockels effect medium, a Kerr effect medium, or combinations thereof. As is described in further detail below with reference to FIGS. 14 and 15, the core material forming the waveguide core 52 may also comprise a medium where a control signal applied to the electrode pattern 30 alters the velocity, phase, polarization, amplitude, or other transmission characteristic of light propagating along the waveguide core 52.

The cladding material 60 may be positioned within the cladding containment regions through a sol-gel process in a manner similar to that described above with reference to the buffer layer 40. The cladding material 60 may also be positioned within the cladding containment regions 54 as a solution, as an aerosol of a solution, as a vapor deposited material, or as an electro-deposited material. As is illustrated in FIGS. 1-3, the cladding material 60 may define a thickness at least as large as a thickness defined by the core material layer 50.

Where a poled cladding material 60 is preferred, the cladding material 60 may be positioned within the cladding containment regions 54 while a poling voltage is applied across the electrode pattern 30. Preferably, the poling voltage is maintained during curing, cross-linking, drying, or thermo-setting of the cladding material. For example, where the cladding material 60 comprises an electrooptic chromophore, a poling voltage is applied so as to be sufficient to orient the chromophore along the poling field in the cladding material 60. As is illustrated in FIG. 7, the electrically insulative barrier layer 70 may be formed over the electrode pattern prior to application of the poling voltage and positioning of the cladding material 60 over the electrically insulating layer 70.

Figure 8:
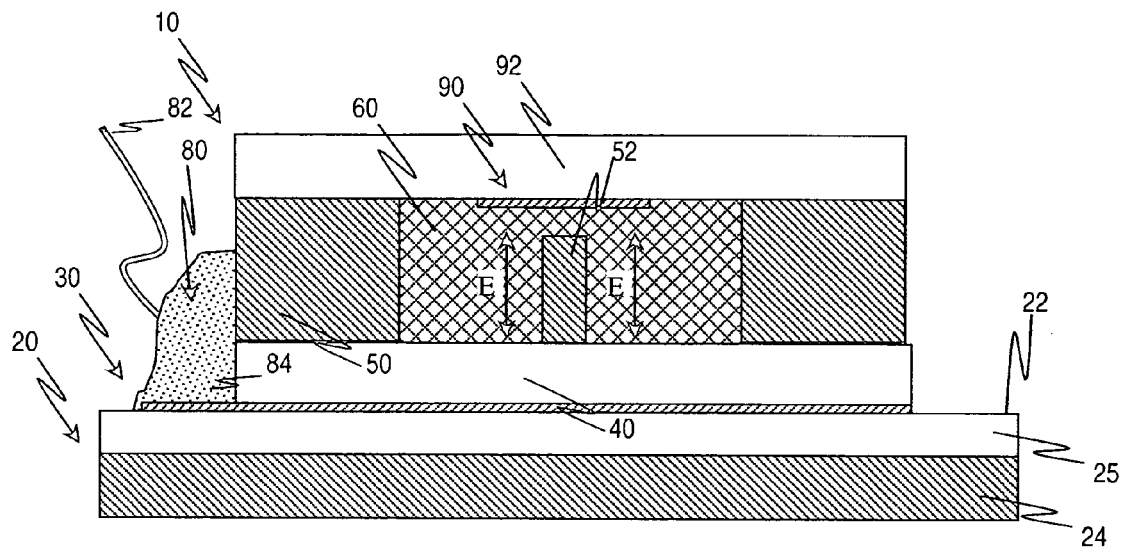
FIGS. 8-12 are schematic illustrations, taken in cross section, of integrated optical devices according to various embodiments of the present invention including control electrodes in addition to the embedded electrodes illustrated in FIGS. 1-3.
Figure 9:
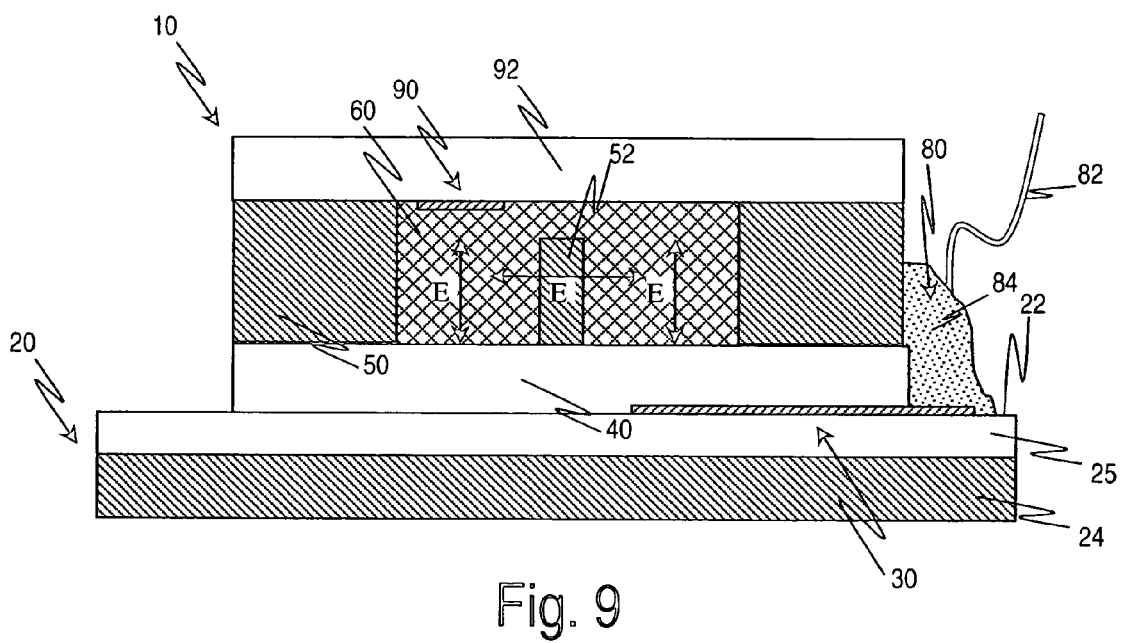

Referring now to FIGS. 8-11, it is noted that an additional electrode pattern 90 may be formed on an electrode superstrate 92 of silica or other suitable material and positioned above the electrode pattern 30 formed over the electrode support surface 22 of the support wafer 20. In FIG. 8, for example the additional electrode pattern 90 comprises a single control electrode substantially aligned with the waveguide core 52. In FIG. 9, the additional electrode pattern 90 comprises a single control electrode offset along one side of the waveguide core 52 while the electrode pattern 30 formed over the electrode support surface 22 of the support wafer 20 comprises a single control electrode offset along an opposite side of the waveguide core 52. The contour of the resulting electric field is predominantly horizontal in areas relatively close to the core 52 and predominantly vertical in portions of the cladding material offset from the core 52. In this manner, the contour of the electric field is such that the respective orientations of the electric field and the poling contour are configured to compensate for optical birefringence of the poled cladding material or optically functional core material. As a result, the TM mode index of the waveguide device 10 can be substantially equal to the TE mode index of the waveguide device 10. Alternatively, the electrodes and core may be configured such that changes in the respective indices are substantially equal. In addition, it is contemplated that the electrodes and core may be configured to affect only one of the polarization modes.

Figure 10:
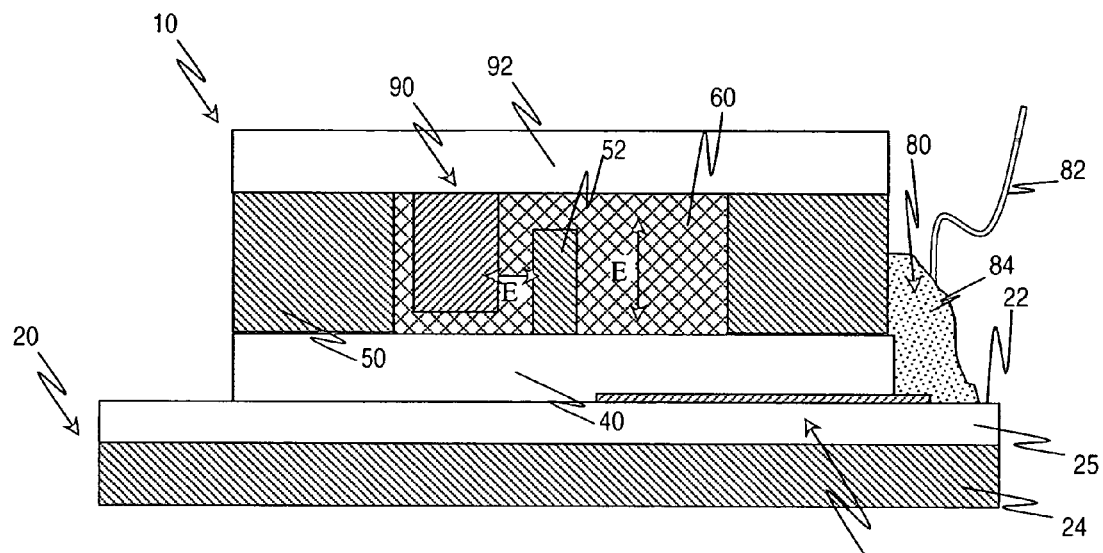
Figure 11:
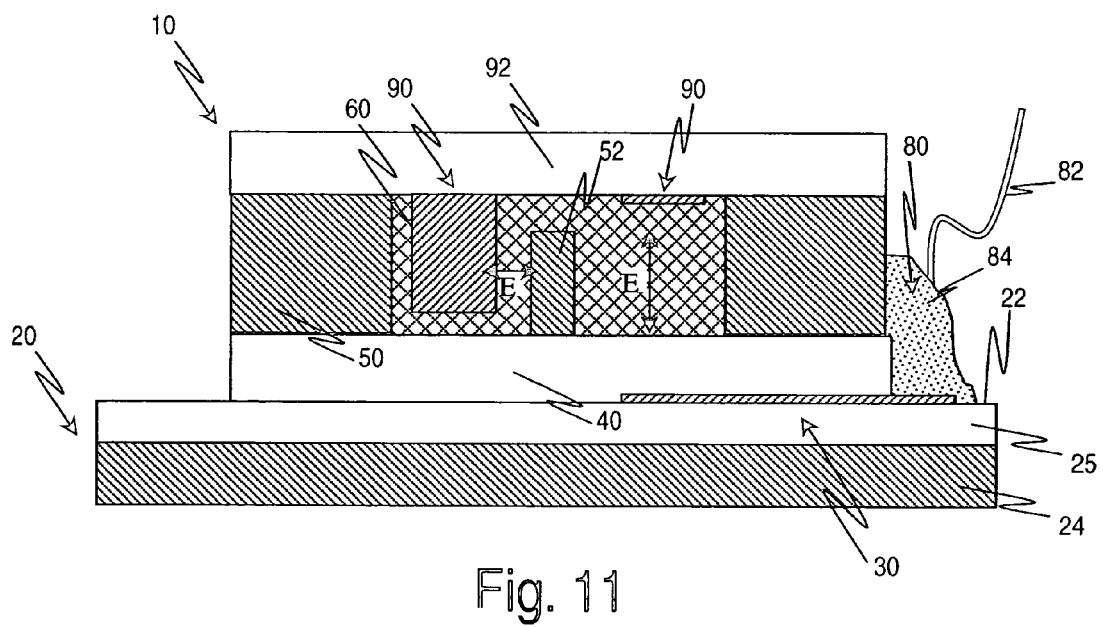
Figure 12:
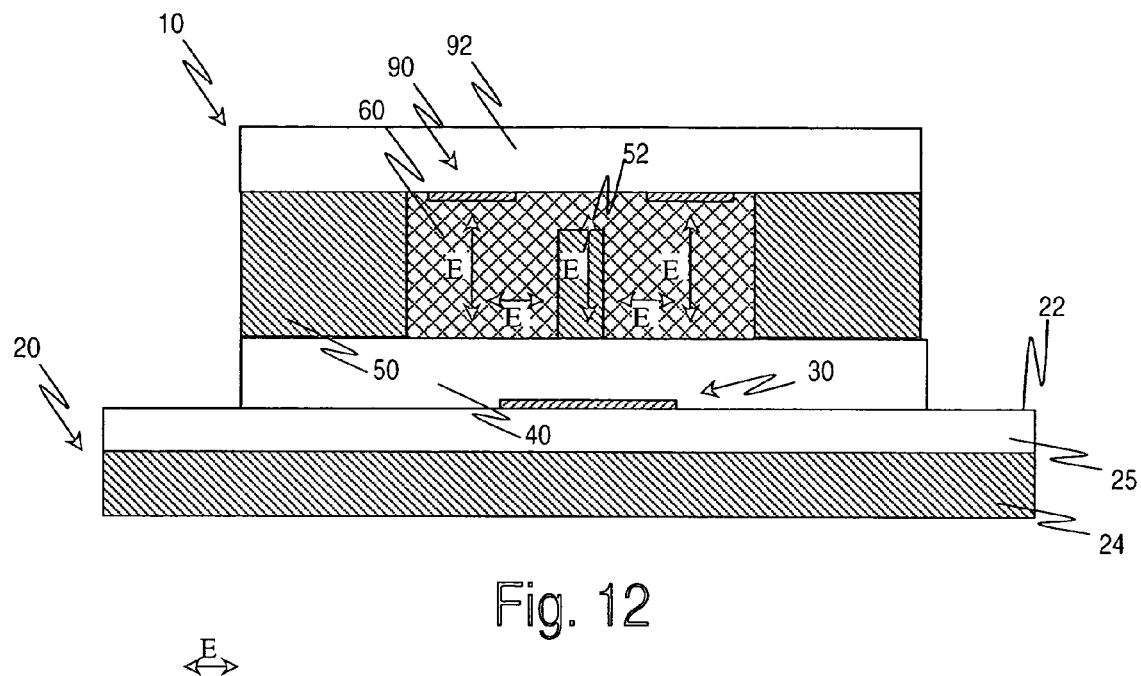

The electrode configuration of the embodiment of FIGS. 10-12 are also directed at ensuring that the TM mode index of the waveguide device 10 can be substantially equal to the TE mode index of the waveguide device 10. Specifically, in FIG. 10, a single control electrode of the additional electrode pattern 90 is offset along one side of the waveguide core 52 and defines a thickness sufficient to extend alongside a substantial portion of the waveguide core 52. The control electrode of the electrode pattern 30 is offset along the opposite side of the waveguide core 52. The resulting contoured electric field is predominantly horizontal on the side of the core 52 with the enhanced thickness electrode and predominantly vertical on the opposite side of the core 52.

Similarly, in FIG. 11, one of the control electrodes of the additional electrode pattern 90 is offset along one side of the waveguide core 52 and defines a thickness sufficient to extend alongside a substantial portion of the waveguide core 52. An additional control electrode of the electrode pattern 90 is offset along the opposite side of the waveguide core 52 and defines a reduced thickness. The resulting contoured electric field is predominantly horizontal on the side of the core 52 with the enhanced thickness electrode and predominantly vertical on the opposite side of the core 52.

In FIG. 12, the additional electrode pattern 90 comprises a pair of control electrodes offset along opposite sides of the waveguide core 52. The electrode pattern 30 formed over the electrode support surface 22 of the support wafer 20 comprises a single control electrode substantially aligned with the waveguide core 52. The resulting contoured electric field is predominantly vertical in the areas of the cladding 60 aligned with the pair of control electrodes of the additional electrode pattern 90, predominantly horizontal in the areas of the cladding adjacent to the core, and predominantly vertical in the area of the core 52.

Figure 14:
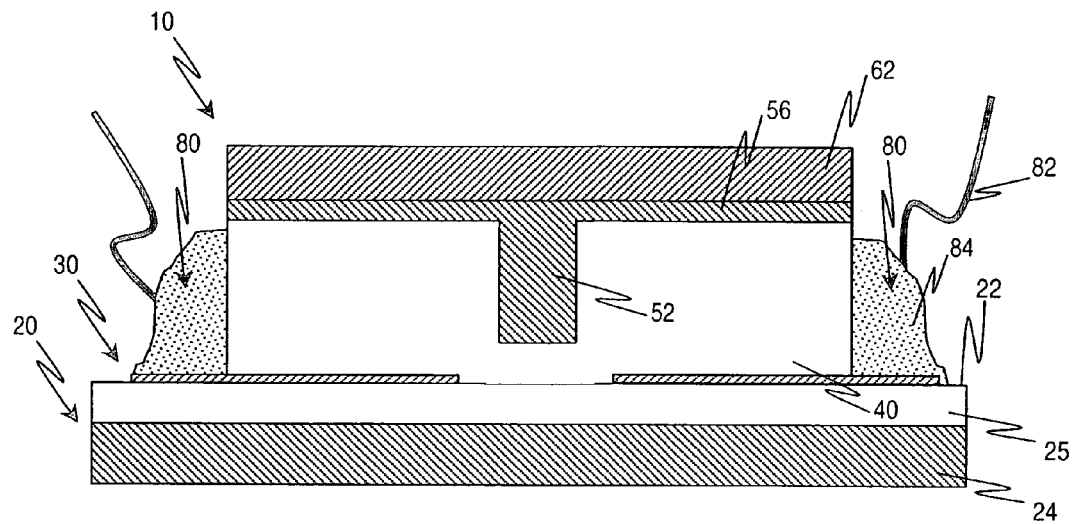
FIGS. 14 and 15 are schematic illustrations, taken in cross section, of further integrated optical devices according to various embodiments of the present invention.
Figure 15:
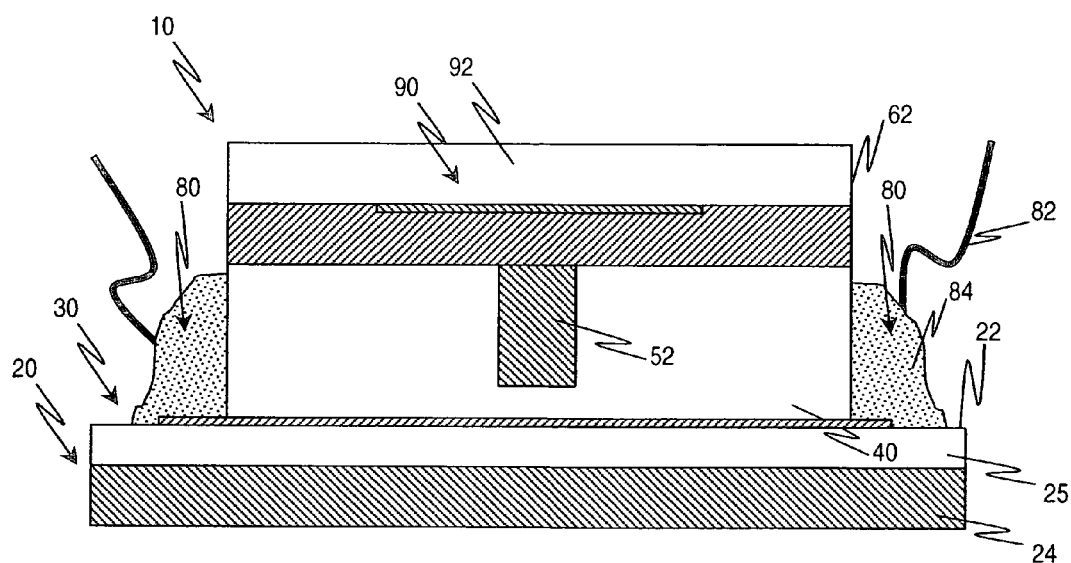

Referring to FIGS. 14 and 15, the material forming the core 52 may comprise an optically functional material, i.e., an electrooptic medium or any other medium where a control signal applied to the electrode patterns 30, 90 alters the velocity, phase, polarization, amplitude, or some other transmission characteristic of light propagating along the waveguide core 52. In the embodiments of FIGS. 14 and 15, portions of the buffer layer 40 are removed to define a core material containment region in which the core material is introduced. The core material containment region is defined in the buffer layer 40 prior to formation of the waveguide core 52 over the buffer layer. For the purposes of defining and describing the present invention, it is noted that the core 52 is described as being formed "over" the buffer layer 40, even though it is not positioned above the entire buffer layer 40.

In the embodiment of FIG. 14, the waveguide core material extends beyond the core material containment region to define a core material overlayer 56. In contrast, in the embodiment of FIG. 15, the waveguide core material is substantially confined within the core material containment region defined by the buffer layer 40.

FIGS. 14 and 15 also illustrate two different types of electrode arrangements. It is contemplated that any of a variety of suitable electrode arrangements may be employed in the embodiments of FIGS. 14 and 15, including those illustrated in the remaining embodiments of the present application.

For the purposes of defining and describing the present invention, it is noted that the wavelength of "light" or an "optical signal" is not limited to any particular wavelength or portion of the electromagnetic spectrum. Rather, "light" and "optical signals," which terms are used interchangeably throughout the present specification and are not intended to cover distinct sets of subject matter, are defined herein to cover any wavelength of electromagnetic radiation capable of propagating in an optical waveguide. For example, light or optical signals in the visible and infrared portions of the electromagnetic spectrum are both capable of propagating in an optical waveguide. An optical waveguide may comprise any suitable signal propagating structure. Examples of optical waveguides include, but are not limited to, optical fibers, slab waveguides, and thin-films used, for example, in integrated optical circuits.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. For example, with reference to the various embodiments of the present invention, it is noted that the various core, cladding, buffer, and overlayer regions of the present invention, and different respective portions thereof, may comprise optically functional or non-functonal materials. It is also noted that waveguide devices according to the present invention may be employed in a telecommunications or other type of optical network. In addition, although some aspects of the present invention are identified herein as preferred, typical, or particularly advantageous, it is contemplated that the present invention is not necessarily limited to these aspects of the invention.

What is claimed is:

1. A method of fabricating an integrated optical device, said method comprising:

providing a support wafer defining an electrode support surface;

forming an electrode pattern over said electrode support surface of said support wafer;

forming a non-polymeric buffer layer on at least a portion of said electrode pattern and over at least a portion of said support wafer;

forming a non-polymeric, silica-based waveguide core material layer over said non-polymeric buffer layer;

removing portions of said core material layer to define a non-polymeric waveguide core and a pair of cladding containment regions extending along opposite sides of said non-polymeric waveguide core in a direction substantially parallel to a longitudinal dimension of said non-polymeric waveguide core, wherein each of said pair of cladding containment regions is defined between distinct pairs of opposing side walls and the waveguide core is disposed between the cladding containment regions such that each side of the waveguide core forms a side wall of a cladding containment region; and positioning a polymeric cladding material within at least a substantial portion of said pair of cladding containment regions so as to place said polymeric cladding material in optical communication with said non-polymeric waveguide core such that said non-polymeric buffer layer, said polymeric cladding material, and said non-polymeric waveguide core define an optically-clad waveguide core, wherein at least one of said cladding material and said waveguide core are configured such that a control signal applied to said electrode pattern alters a transmission characteristic of an optical signal propagating along said waveguide core.

2. A method of fabricating an integrated optical device as claimed in claim 1 wherein said electrode pattern, said buffer layer, and said waveguide core are formed such that said electrode pattern is embedded in said device beneath said waveguide core.

3. A method of fabricating an integrated optical device as claimed in claim 1 wherein said electrode pattern defines at least two electrically isolated control electrodes and said waveguide core is formed through a process by which said position of said core in a plane offset from and generally parallel to a plane occupied by said control electrodes is controlled relative to respective positions of said control electrodes in said control electrode plane.

4. A method of fabricating an integrated optical device as claimed in claim 1 further comprising the step of positioning an additional electrode pattern above said electrode pattern formed over said electrode support surface of said support wafer.

5. A method of fabricating an integrated optical device as claimed in claim 4 wherein said additional electrode pattern comprises a single control electrode substantially aligned with said waveguide core.

6. A method of fabricating an integrated optical device as claimed in claim 4 wherein said additional electrode pattern comprises a single control electrode offset along one side of said waveguide core and said electrode pattern formed over said electrode support surface of said support wafer comprises a single control electrode offset along an opposite side of said waveguide core.

7. A method of fabricating an integrated optical device as claimed in claim 6 wherein said single control electrode offset along one side of said waveguide core defines a thickness sufficient to extend alongside a substantial portion of said waveguide core.

8. A method of fabricating an integrated optical device as claimed in claim 6 wherein said additional electrode pattern comprises an additional single control electrode offset along said opposite side of said waveguide core above said electrode pattern formed over said electrode support surface of said support wafer.

9. A method of fabricating an integrated optical device as claimed in claim 4 wherein:
said additional electrode pattern comprises a single control electrode offset along one side of said waveguide core and an additional single control electrode offset along an opposite side of said waveguide core; and
said electrode pattern formed over said electrode support surface of said support wafer comprises a single control electrode substantially aligned with said waveguide core.

10. A method of fabricating an integrated optical device as claimed in claim 1 wherein said electrode pattern comprises at least one material selected from Au, Pt, Cr, Ta, Ti, indium tin oxide, and combinations thereof.

11. A method of fabricating an integrated optical device as claimed in claim 1 wherein said electrode pattern comprises Cr.

12. A method of fabricating an integrated optical device as claimed in claim 1 wherein said electrode pattern comprises a conductive material characterized by a melting point of at least about 1500° C.

13. A method of fabricating an integrated optical device as claimed in claim 1 wherein said electrode pattern comprises first and second conductive layers, said first conductive layer having relatively enhanced adhesive properties and said second conductive layer having relatively enhanced conductive properties.

14. A method of fabricating an integrated optical device as claimed in claim 1 wherein said buffer layer is formed on said electrode pattern and said support wafer.

15. A method of fabricating an integrated optical device as claimed in claim 1 wherein said buffer layer is formed through a sol-gel process.

16. A method of fabricating an integrated optical device as claimed in claim 15 wherein said sol-gel process is characterized by a maximum processing temperature below about 400° C.

17. A method of fabricating an integrated optical device as claimed in claim 1 wherein said buffer layer is formed at a maximum processing temperature at least 500° C. below a melting point of said buffer layer.

18. A method of fabricating an integrated optical device as claimed in claim 1 wherein said buffer layer is formed at a maximum processing temperature at least 500° C. below a melting point of said electrode pattern.

19. A method of fabricating an integrated optical device as claimed in claim 1 wherein said buffer layer is formed through a plasma enhanced chemical vapor deposition process.

20. A method of fabricating an integrated optical device as claimed in claim 19 wherein said plasma enhanced chemical vapor deposition process is characterized by a maximum processing temperature below about 1000° C.

21. A method of fabricating an integrated optical device as claimed in claim 1 wherein said buffer layer comprises a silica-based buffer layer.

22. A method of fabricating an integrated optical device as claimed in claim 1 further comprising the act of removing portions of said buffer layer while leaving a sufficient amount of said buffer layer unremoved to define a remaining protective layer over said electrode pattern.

23. A method of fabricating an integrated optical device as claimed in claim 1 wherein said buffer layer comprises a material having a refractive index lower than a refractive index of said core material at an operating temperature and operating wavelength of said device.

24. A method of fabricating an integrated optical device as claimed in claim 1 wherein said buffer layer comprises a material characterized by a refractive index of between about 1.440 and about 1.450 at a selected operating temperature and operating wavelength of said device.

25. A method of fabricating an integrated optical device as claimed in claim 1 wherein said buffer layer comprises a material that is transmissive to light of at least one of the following wavelengths: about 1.3 µm and about 1.55 µm.

26. A method of fabricating an integrated optical device as claimed in claim 1 wherein said buffer layer comprises an electrically insulating, non-metallic material.

27. A method of fabricating an integrated optical device as claimed in claim 1 wherein said core layer comprises a material selected from polymers, silica, doped silica, and combinations thereof.

28. A method of fabricating an integrated optical device as claimed in claim 1 wherein said core layer is formed through a sol-gel process.

29. A method of fabricating an integrated optical device as claimed in claim 1 wherein said core layer comprises a material characterized by a refractive index of between about 1.450 and about 1.455 at a selected operating temperature and operating wavelength of said device.

30. A method of fabricating an integrated optical device as claimed in claim 1 wherein said portions of said core layer are removed through reactive ion etching.

31. A method of fabricating an integrated optical device as claimed in claim 1 wherein said waveguide core is formed by patterning said core material layer utilizing a waveguide mask.

32. A method of fabricating an integrated optical device as claimed in claim 1 wherein said cladding material comprises an electrooptic medium.

33. A method of fabricating an integrated optical device as claimed in claim 32 wherein said cladding material comprises a medium dominated by the Pockels effect.

34. A method of fabricating an integrated optical device as claimed in claim 32 wherein said cladding material comprises a medium dominated by the Kerr effect.

35. A method of fabricating an integrated optical device as claimed in claim 1 wherein said cladding material is positioned in optical communication with said waveguide core through a sol-gel process.

36. A method of fabricating an integrated optical device as claimed in claim 1 wherein said cladding material is positioned in optical communication with said waveguide core as a polymeric solution.

37. A method of fabricating an integrated optical device as claimed in claim 1 wherein said cladding material is positioned in optical communication with said waveguide core as an aerosol of a polymeric solution.

38. A method of fabricating an integrated optical device as claimed in claim 1 wherein said cladding material is positioned in optical communication with said waveguide core as a vapor deposited polymer.

39. A method of fabricating an integrated optical device as claimed in claim 1 wherein said cladding material is positioned in optical communication with said waveguide core as an electro-deposited polymer.

40. A method of fabricating an integrated optical device as claimed in claim 1 wherein said cladding material defines a thickness at least as large as a thickness defined by said core material layer.

41. A method of fabricating an integrated optical device as claimed in claim 1 wherein further portions of said core material layer and said buffer layer are removed to define a pair of contact regions over said electrode pattern.

42. A method of fabricating an integrated optical device as claimed in claim 41 wherein said pair of contact regions is treated with hydrofluoric acid to remove residual material from said pair of contact regions.

43. A method of fabricating an integrated optical device as claimed in claim 1 wherein portions of said buffer layer are removed to define a core material containment region.

44. A method of fabricating an integrated optical device as claimed in claim 43 wherein said core material containment region is defined prior to formation of said waveguide core material layer over said buffer layer.

45. A method of fabricating an integrated optical device as claimed in claim 1 wherein said waveguide core material layer is formed within a core material containment region defined by said buffer layer.

46. A method of fabricating an integrated optical device as claimed in claim 45 wherein said waveguide core material layer extends beyond said core material containment region defined by said buffer layer.

47. A method of fabricating an integrated optical device as claimed in claim 45 wherein said waveguide core material layer is substantially confined within said core material containment region defined by said buffer layer.

48. A method of fabricating an integrated optical device, said method comprising:
   providing a support wafer defining an electrode support surface;
   forming an electrode pattern over said electrode support surface of said support wafer wherein said electrode pattern is formed so as to define at least two electrically isolated control electrodes over said electrode support surface;
   forming a non-polymeric buffer layer on at least a portion of said electrode pattern and over at least a portion of said support wafer;
   forming a waveguide core material layer over said non-polymeric buffer layer;
   removing portions of said core material layer to define a waveguide core and a pair of cladding containment regions extending along opposite sides of said waveguide core in a direction substantially parallel to a longitudinal dimension of said waveguide core, wherein each of said pair of cladding containment regions is defined between distinct pairs of opposing side walls and the waveguide core is disposed between the cladding containment regions such that each side of the waveguide core forms a side wall of a cladding containment region; and
   positioning a cladding material within at least a substantial portion of said pair of cladding containment regions so as to place said cladding material in optical communication with said waveguide core such that said buffer layer, said cladding material, and said waveguide core define an optically-clad waveguide core, wherein an electrically insulative baffler layer is formed over said control electrodes prior to positioning said cladding material in optical communication with said waveguide core and at least one of said cladding material and said waveguide core are configured such that a control signal applied to said electrode pattern alters a transmission characteristic of an optical signal propagating along said waveguide core.

49. A method of fabricating an integrated optical device as claimed in claim 48 wherein said electrically insulative baffler layer is formed over said control electrodes as a layer of silica.

50. A method of fabricating an integrated optical device as claimed in claim 48 wherein a sufficient portion of said buffer layer formed over said electrode pattern is maintained prior to positioning said cladding material in optical communication with said waveguide core so as to form said electrically insulative barrier between said isolated control electrodes.

51. A method of fabricating an integrated optical device as claimed in claim 48 wherein said electrode pattern is formed such that said control electrodes are substantially co-planar.

52. A method of fabricating an integrated optical device as claimed in claim 51 wherein said cladding material comprises an electrooptic chromophore.

53. A method of fabricating an integrated optical device, said method comprising:
   providing a support wafer defining an electrode support surface;
   forming an electrode pattern over said electrode support surface of said support wafer;
   forming a non-polymeric buffer layer on at least a portion of said electrode pattern and over at least a portion of said support wafer;
   forming a waveguide core material layer over said non-polymeric buffer layer;
   removing portions of said core material layer to define a waveguide core and a pair of cladding containment regions extending along opposite sides of said waveguide core in a direction substantially parallel to a longitudinal dimension of said waveguide core, wherein each of said pair of cladding containment regions is defined between distinct pairs of opposing side walls and the waveguide core is disposed between the cladding containment regions such that each side of the waveguide core forms a side wall of a cladding containment region; and
   positioning a cladding material within at least a substantial portion of said pair of cladding containment regions so as to place said cladding material in optical communication with said waveguide core while a poling voltage is applied across said electrode pattern such that said buffer layer, said cladding material, and said waveguide core define an optically-clad waveguide core, wherein at least one of said cladding material and said waveguide core are configured such that a control signal applied to said electrode pattern alters a transmission characteristic of an optical signal propagating along said waveguide core.

54. A method of fabricating an integrated optical device as claimed in claim 53 wherein said poling voltage is maintained during curing, cross-linking, or thermo-setting of said cladding material.

55. A method of fabricating an integrated optical device as claimed in claim 53 wherein said cladding material comprises an electrooptic chromophore and said poling voltage is applied so as to be sufficient to orient said chromophore along a resulting electric field in said cladding material.

56. A method of fabricating an integrated optical device as claimed in claim 53 wherein an electrically insulative barrier layer is formed over said electrode pattern prior to application of said poling voltage and said cladding material is positioned over said electrically insulating layer.

57. A method of fabricating an integrated optical device, said method comprising:
   providing a support wafer defining an electrode support surface;
   forming an electrode pattern over said electrode support surface of said support wafer;
   forming a non-polymeric buffer layer on at least a portion of said electrode pattern and over at least a portion of said support wafer;
   forming a waveguide core material layer over said non-polymeric buffer layer;
   removing portions of said core material layer to define a waveguide core and a pair of cladding containment regions extending along opposite sides of said waveguide core in a direction substantially parallel to a longitudinal dimension of said waveguide core, wherein each of said pair of cladding containment regions is defined between distinct pairs of opposing side walls and the waveguide core is disposed between the cladding containment regions such that each side of the waveguide core forms a side wall of a cladding containment region; and
   positioning a cladding material within at least a substantial portion of said pair of cladding containment regions so as to place said cladding material in optical communication with said waveguide core such that said buffer layer, said cladding material, and said waveguide core define an optically-clad waveguide core, wherein at least one of said cladding material and said waveguide core are configured such that a control signal applied to said electrode pattern alters a transmission characteristic of an optical signal propagating along said waveguide core.

58. A method of fabricating an integrated optical device, said method comprising:
   providing a support wafer defining an electrode support surface;
   forming an electrode pattern over said electrode support surface of said support wafer;
   forming a buffer layer over said electrode pattern and said support wafer through a sol-gel process characterized by a maximum processing temperature below about 400° C.;
   forming a waveguide core and a pair of cladding containment regions over said buffer layer, wherein each of said pair of cladding containment regions is defined between distinct pairs of opposing side walls and the waveguide core is disposed between the cladding containment regions such that each side of the wave guide core forms a side wall of a cladding containment region; and
   positioning a cladding material within at least a substantial portion of said pair of cladding containment regions so as to place said cladding material in optical communication with said waveguide core such that said buffer layer, said cladding material, and said waveguide core define an optically clad waveguide core, wherein at least one of said cladding material and said waveguide core are configured such that a control signal applied to said electrode pattern alters a transmission characteristic of an optical signal propagating along said waveguide core.

59. An integrated optical device comprising:
   a support wafer defining an electrode support surface;
   an electrode pattern formed over said electrode support surface of said support wafer;
   a non-polymeric buffer layer formed on at least a portion of said electrode pattern and over at least a portion of said support wafer;
   a non-polymeric, silica-based waveguide core material layer formed over said buffer layer;
   a polymeric cladding material positioned within at least a substantial portion of a pair of cladding containment regions so as to place said polymeric cladding material in optical communication with said non-polymeric waveguide core such that said non-polymeric buffer layer, said polymeric cladding material, and said non-polymeric waveguide core define an optically-clad waveguide core, wherein each of said pair of cladding containment regions is defined between distinct pairs of opposing side walls and the waveguide core is disposed between the cladding containment regions such that each side of the waveguide core forms a side wall of a cladding containment region and at least one of said cladding material and said waveguide core are configured such that a control signal applied to said electrode pattern alters a transmission characteristic of an optical signal propagating along said waveguide core.

* * * * *

UNITED STATES PATENT AND TRADEMARK OFFICE
CERTIFICATE OF CORRECTION

PATENT NO. : 7,373,047 B2 Page 1 of 1
APPLICATION NO. : 10/719892
DATED : May 13, 2008
INVENTOR(S) : Nippa et al.

It is certified that error appears in the above-identified patent and that said Letters Patent is hereby corrected as shown below:

Col. 12, line 12, claim 48 "baffler" should read as --barrier--
Col. 12, line 22, claim 48 "baffler" should read as --barrier--

Signed and Sealed this

Twenty-seventh Day of January, 2009

JOHN DOLL
*Acting Director of the United States Patent and Trademark Office*